United States Patent [19]

Kawamura et al.

[11] Patent Number: 5,764,286
[45] Date of Patent: Jun. 9, 1998

[54] STILL VIDEO CAMERA HAVING PLURAL SELECTABLE DATA COMPRESSION CIRCUITS

[75] Inventors: Hideaki Kawamura, Kanagawa-ken; Kan Takaiwa, Tokyo; Hiroyuki Horii, Kanagawa-ken, all of Japan

[73] Assignee: Canon Kabushiki Kaisha, Tokyo, Japan

[21] Appl. No.: 333,868

[22] Filed: Nov. 3, 1994

Related U.S. Application Data

[63] Continuation of Ser. No. 170,459, Dec. 20, 1993, abandoned, which is a continuation of Ser. No. 911,253, Jul. 7, 1992, abandoned, which is a continuation of Ser. No. 497,195, Mar. 22, 1990, abandoned.

[30] Foreign Application Priority Data

Mar. 30, 1989 [JP] Japan ........................ 1-79588
May 19, 1989 [JP] Japan ........................ 1-124559

[51] Int. Cl.$^6$ .............................. H04N 5/76; H04N 11/02
[52] U.S. Cl. ............................ 348/232; 348/233; 348/407; 348/424; 358/906; 358/909.1; 386/109
[58] Field of Search ............................ 348/222, 207, 348/233, 231, 384, 390, 397, 399, 409, 420, 424, 415, 232; 358/909.1, 906; 333/14; 375/242-253; 382/232, 250; 386/33, 109; H04N 5/225, 9/04, 11/02, 11/04, 7/13, 7/133, 7/137, 5/76

[56] References Cited

U.S. PATENT DOCUMENTS

| | | | |
|---|---|---|---|
| 3,784,737 | 1/1974 | Waehner | 358/133 |
| 4,409,621 | 10/1983 | Richards et al. | 358/260 |
| 4,472,740 | 9/1984 | Doi | 358/209 |
| 4,489,351 | 12/1984 | d'Alayer de Costemore d'Arc | 358/213 |
| 4,745,473 | 5/1988 | Hall | 358/133 |
| 4,758,883 | 7/1988 | Kawahara et al. | 358/44 |
| 4,802,005 | 1/1989 | Kondo | 358/135 |
| 4,831,636 | 5/1989 | Taniguchi et al. | 358/133 X |
| 4,837,724 | 6/1989 | Borgers et al. | 364/725 |
| 4,855,779 | 8/1989 | Ishikawa et al. | 354/412 |
| 4,860,313 | 8/1989 | Shpiro | 375/27 |
| 5,018,017 | 5/1991 | Sasaki et al. | 358/209 |
| 5,032,927 | 7/1991 | Watanabe et al. | 358/335 |

Primary Examiner—John K. Peng
Assistant Examiner—John W. Miller
Attorney, Agent, or Firm—Robin, Blecker & Daley

[57] ABSTRACT

A still video camera using a solid-state memory device as an image recording medium and wherein outset image data exists for processing comprises a plurality of data compression circuits, wherein one of the plurality of data compression circuits is selected according to the amount of image data following processing of the outset image data. The plurality of data compression circuits may effect compression of data by a data compression method selected from the compression method group consisting of DCPM, ADPCM and discrete cosine transformation. The plurality of data compression circuits may effect data compression by the same data compression method with respective different compressing characteristics.

11 Claims, 4 Drawing Sheets

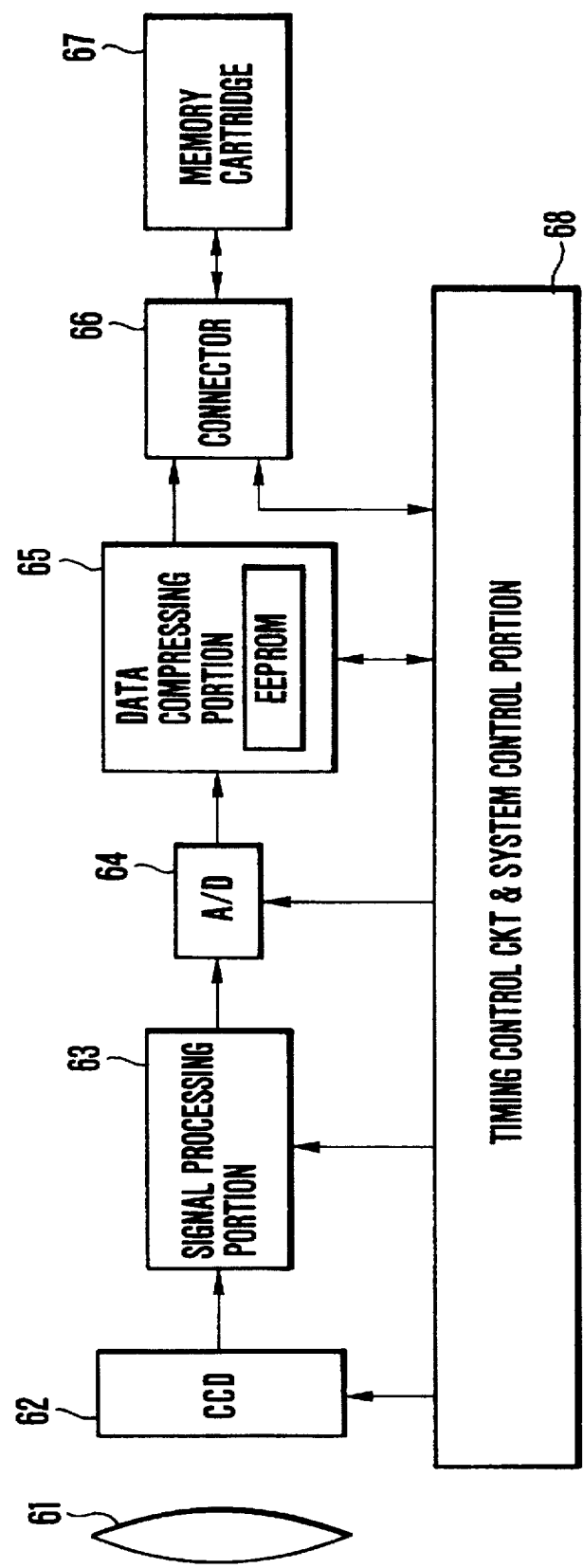

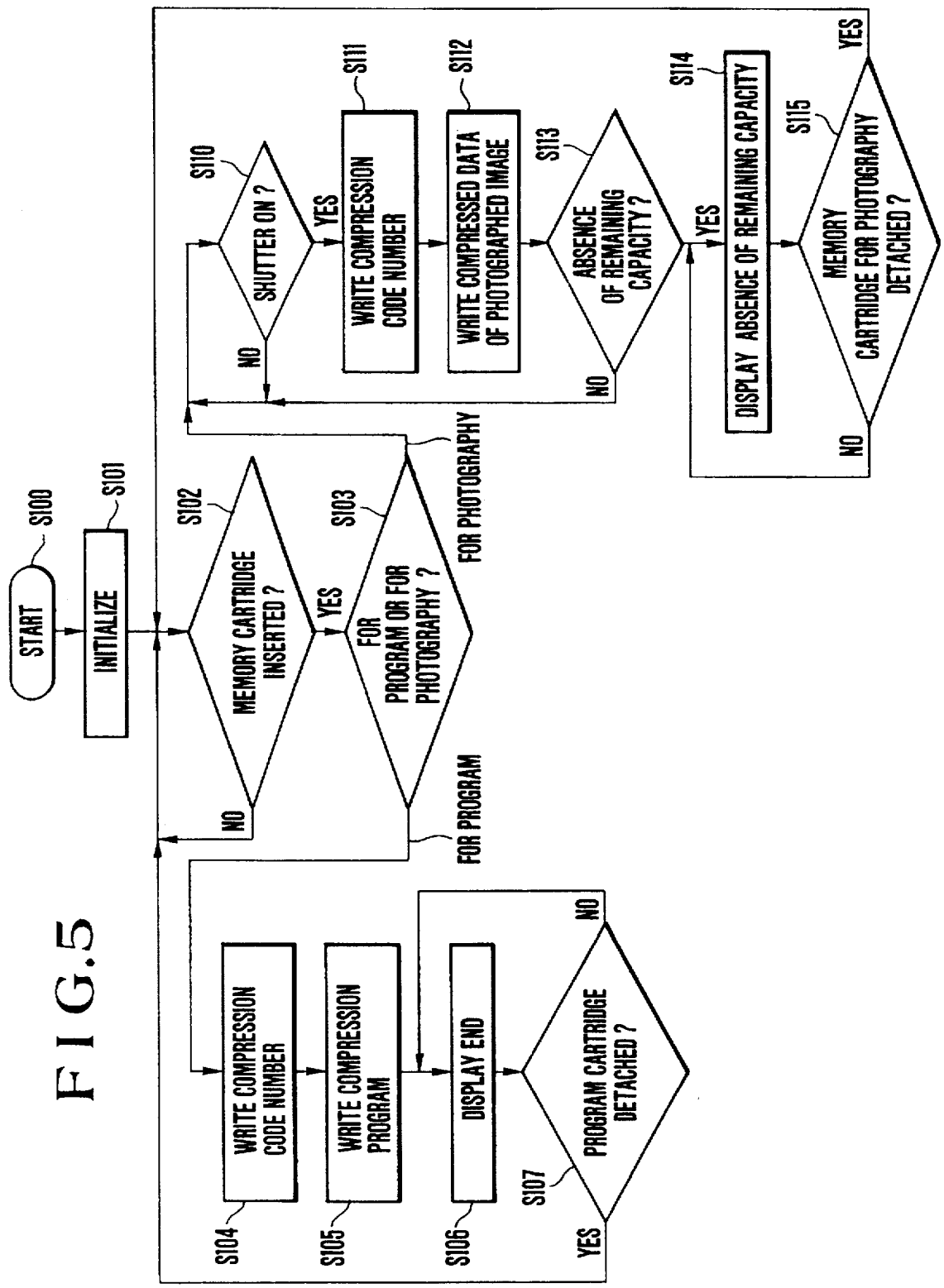

STILL VIDEO CAMERA HAVING PLURAL SELECTABLE DATA COMPRESSION CIRCUITS

This is a continuation of prior application Ser. No. 08/170,459 (aban.) filed Dec. 20, 1993, which is a cont. of Ser. No. 07/911,253 (aban.) filed on Jul. 7, 1992 which is a cont. of Ser. No. 07/497,195 (aban.) filed on Mar. 22, 1990.

BACKGROUND OF THE INVENTION

1. Field of the Invention

This invention relates to still video cameras using a solid-state memory device as the image recording medium.

2. Description of the Related Art

Electronic still video cameras using a magnetic floppy disc as the image recording medium are known ID view of recent advances in the high storage and low cost unit production technique of semiconductor memories, a new type of still video camera which makes use of a semiconductor memory device as the image recording medium is regarded as promising.

The image sensor of the still video camera, for example, the CCD type image sensor, even in the present state of art, has some five hundred thousand picture elements In the near future, it is likely to realize an increase of the number of picture elements to one million or more. To store data of the great number of picture elements in the memory without deterioration, as one picture element takes 8 bits, for one frame of five hundred thousand picture elements, four megabits have to be used. To provide an image storage capacity of 25 frames equivalent to that of a magnetic floppy disc, the number must be increase by a factor of twenty-five to one hundred megabits However far the high storage capacity technique of semiconductor memories may advance, there can be demerits in cost, size and consumption of electric power.

In addition, the prior known camera of the above-described new type is made to include a compressing means. This compressing means is of the fixed form. So, it has been impossible either to selectively use a plurality of compressing methods, or to alter the compressing method.

SUMMARY OF THE INVENTION

A first object of the invention is to provide a still video camera capable of recording a large amount of image information in a limited memory capacity.

The still video camera of an embodiment according to the invention is a still video camera using a solid-state memory device as the image recording medium, characterized in that a plurality of data compressing means including non-compression are provided, and that one of the plurality of compressing means is selected according to image data.

According to the above-described embodiment, by the above-described means, for the given image data; a proper one of the compression processes can be selected and the data amount necessary to record can be lessened. Therefore, it becomes possible to efficiently utilize the image recording medium.

Also, the present invention has been made under such situations as described above, and its second object is to provide a still video camera which can arbitrarily alter the compressing method.

In another embodiment of the invention, to achieve the above-described object, the still video camera is constructed in the following way (1) or (2):

(1) A still video camera in which the video signal output from the image sensor is analog-to-digital-converted and further compressed, before it is written in a memory element attachable to and detachable from the camera body, is provided with memory means capable of writing and erasing by an electrical signal supplied from the outside of the camera and usable for writing programs for the above-described compression.

(2) In the aforesaid way (1), a still video camera is provided with a memory element attachable to and detachable from the camera body, the memory element having programs for compression written therein, wherein by this memory element, the electrical signal from the outside of the camera is supplied.

According to the arrangement of the aforesaid way (1), the program for compression can be altered by supplying the electrical signal from the outside of the camera. According to the arrangement of the way (2), the program for compression can be altered by attaching the memory element with the program for compression written therein to the camera body.

Other objects and features of the invention will become apparent from the following written specification and drawings.

BRIEF DESCRIPTION OF THE DRAWINGS

FIG. 4 is a block diagram of another embodiment of the invention.

FIG. 5 is a flowchart for the operation of the embodiment of FIG. 4.

DETAILED DESCRIPTION OF THE PREFERRED EMBODIMENTS

The present invention is next described in connection with embodiments thereof by reference to the drawings.

Figure 1:
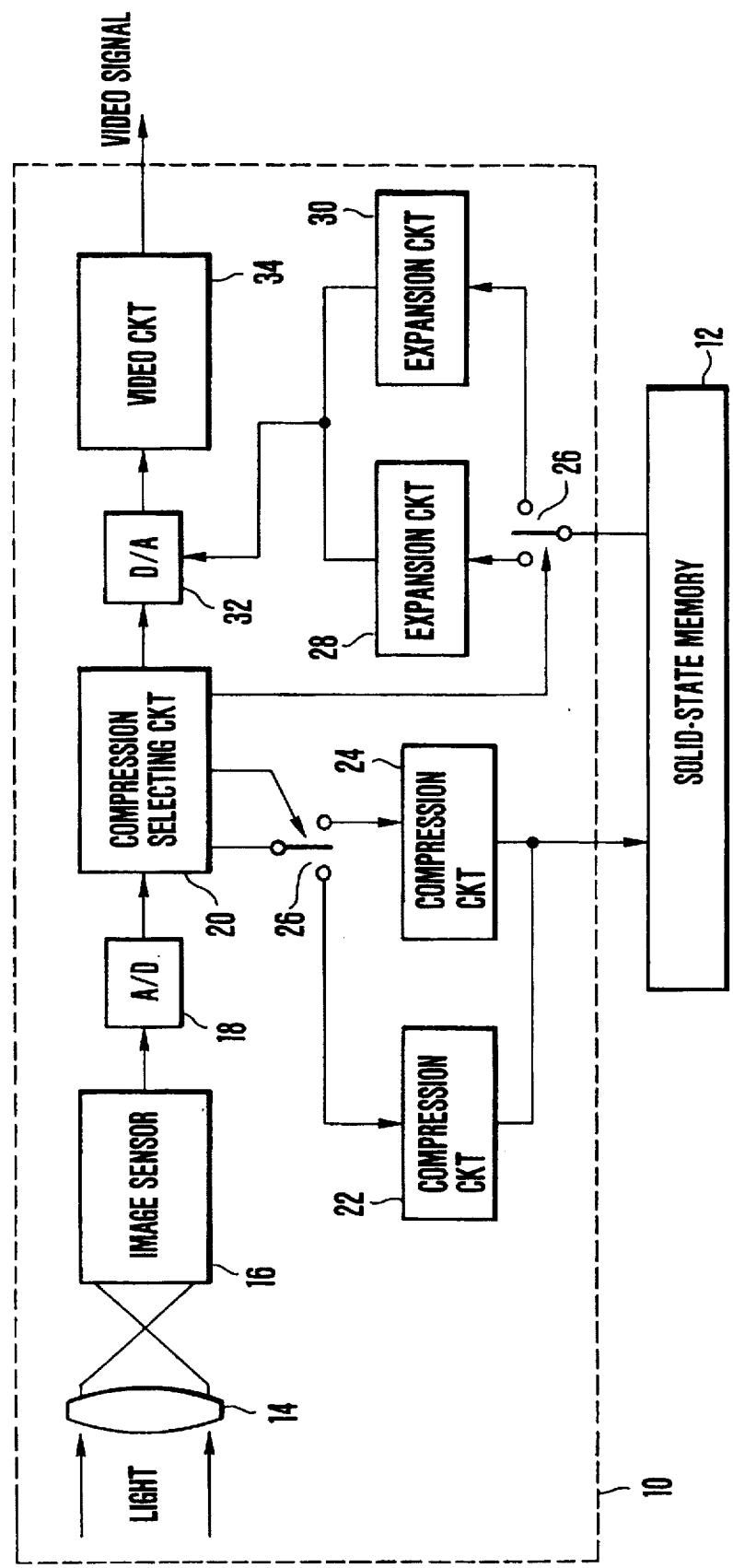
FIG. 1 is a block diagram of the construction of an embodiment of the invention.

FIG. 1 in schematic diagram shows an embodiment of the invention in which two compression processes can be selected to operate. A camera body 10 has a solid-state memory device 12 detachably attached thereto in which photographed images are recorded (stored). Light from an object to be photographed enters, through a photographic lens 14, an image sensor 16 where it is photoelectrically converted. The output of the image sensor 16 is converted to digital form by an A/D converter 18. A compression selecting circuit 20 determines selection of one of compression processes performed by compression circuits 22 and 24 to be applied to the data output from the A/D converter 18. Depending on the selection result, the compression selecting circuit 20 changes a switch 26 over between two positions, so that the output data of the A/D converter 18 is supplied to the selected one of the compression circuits 22 and 24. The compressed data by the compression circuit 22 or 24 is transferred to the solid-state memory device 12 where it is stored in a predetermined format.

If the camera body 10 has only a recording function, the solid-state memory device 12 is then detached from the camera body 10 and attached to a reproduction apparatus (not shown) where the recorded images are reproduced. In FIG. 1, however, the reproducing function too is illustrated.

When the images are reproduced from the solid-state memory device 12, data stored in the solid-state memory device 12 is read out and supplied to one of two expansion circuits 28 and 30 selected by a switch 26. The expansion circuit 28 or 30 performs the expansion process corresponding to the compression process used in the recordings. In more detail, the expansion circuit 28 expands the data compressed by the compression circuit 22, while the expansion circuit 30 expands the data compressed by the compression circuit 24.

The image data restored by the expansion circuit 28 or 30 is converted to analog form by a D/A converter 32, and then to a video signal by a video circuit 34.

It is to be noted that FIG. 1 is depicted with regard to the flow of image signals. Therefore, various kinds of switches for operation commands, a display device and further a control circuit for controlling the entirety, an electric power source circuit, etc., are omitted.

Next, the compression process in the compression circuit 22 or 24 is explained in detail. The natural image has a very strong correlation between any adjacent two of the picture elements. So, taking the differences between the adjacent picture elements gives, in most cases, small values. In other words, compared with the use of the absolute values (of, for example, 8 bits) in storing (recording) the image, the use of their differences in the storage can largely compress the data amount. This compressing method is called the "DPCM". Besides this, there are another compressing methods as improved over the DPCM, one of which is to adaptively vary the non-linearity of the non-linear quantization circuit according to the image, namely, the ADPCM. Yet another method is by transforming the image into a frequency domain, with a larger weight on the coefficient of the low-frequency component and a smaller weight on the coefficient of the high-frequency component, (namely, for example, the discrete cosine transformation).

Figure 2:
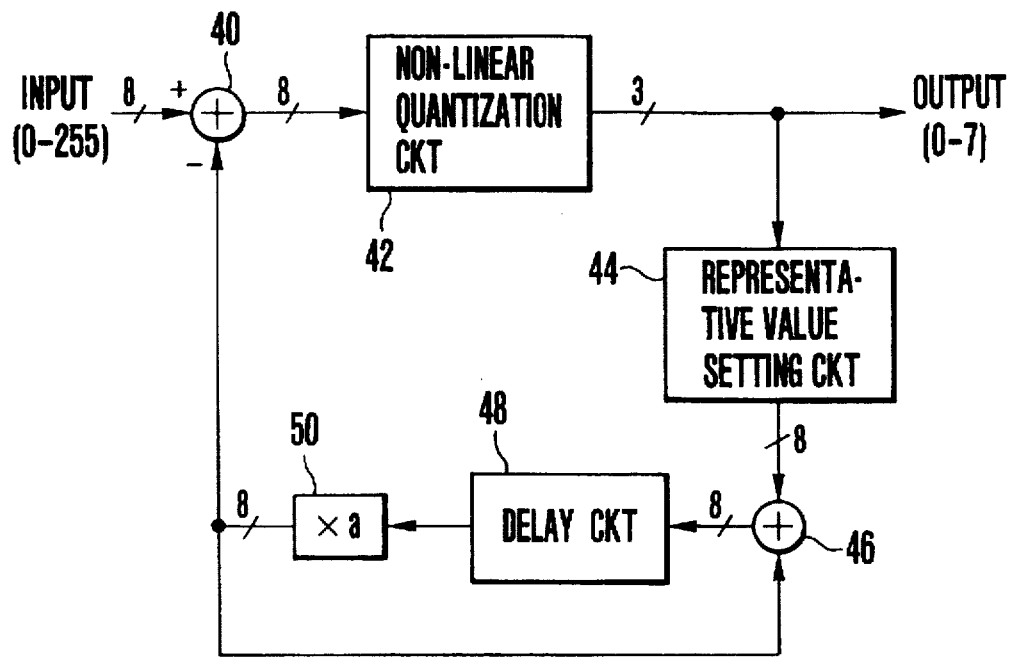
FIG. 2 is a block diagram illustrating the construction of the compression circuit.
Figure 3:
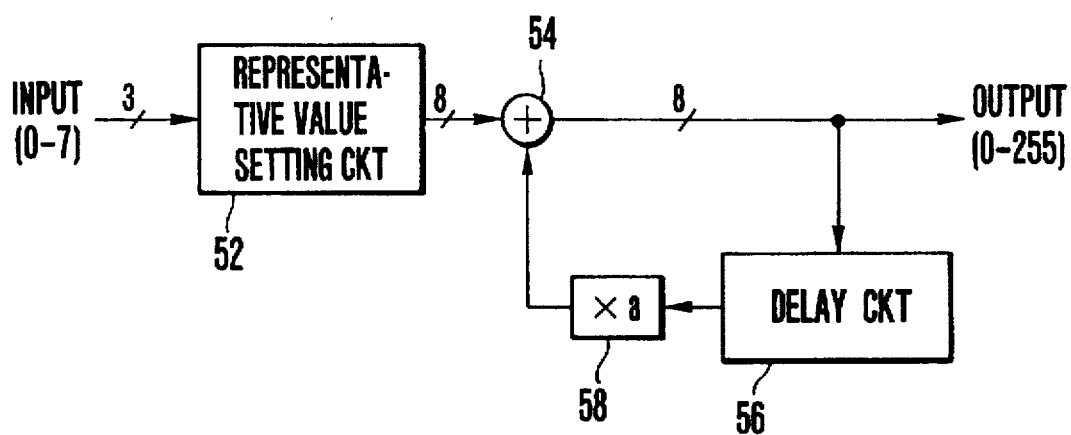
FIG. 3 is a block diagram illustrating the construction of the expansion circuit.

FIG. 2 in block diagram shows the construction of a compression circuit employing the DPCM, and FIG. 3 in block diagram shows the construction of an expansion circuit for expanding the compressed data. Incidentally, their details are described on pp. 146–159 of "Digital Signal Processing of Image" by Keihiko Suibatsu published by Nikkan Kogyo Shinbun Co. Ltd. The circuit of FIG. 2 comprises a subtractor 40, a non-linear quantization circuit 42, a representative value setting circuit 44, an adder 46, a delay circuit 48 and a coefficient multiplier 50. The subtractor 40 subtracts the output of the coefficient multiplier 50 from the input of 8-bit image data. The non-linear quantization circuit 42 non-linearly quantizes the output of the subtractor 40. Thereby the image data of the input is compressed from the 8 bits to, for example, 3 bits. The 3-bit output of the non-linear quantization circuit 42 is the compressed data which is aimed at.

The representative value setting circuit 44 reverts the 3-bit output of the non-linear quantization circuit 42 to a representative value of 8 bits. The adder 46 adds the output of the coefficient multiplier 50 to the output of the representative value setting circuit 44, i.e., the data (8 bits) of the representative value. The output of the adder 46 is delayed by one picture element by the delay circuit 48, concretely speaking, a data latch circuit, before it is supplied to) the coefficient multiplier 50. The coefficient multiplier 50 multiplies the input by a constant coefficient, for example, 0.95, and supplies the multiplication result to the subtractor 40 and the adder 46 at the time of the inputting of the next data.

By repeating such a procedure, the 8-bit data is compressed to the 3-bit data.

The non-linear quantization circuit 42, the representative value setting circuit 44 and the coefficient multiplier 50 can be realized in the form of table transformation of ROM. So, high speed processing is possible.

Next, the expansion circuit of FIG. 3 comprises a representative value setting circuit 52, an adder 54, a delay circuit 56 for delaying the input by one picture element and a coefficient multiplier 58. The representative value setting circuit 52 is similar to the representative value setting circuit 44 of FIG. 2, transforming the input data (3 bits) to a representative value of 8 bits. The adder 54 adds the output of the coefficient multiplier 58 to the output of the representative value setting circuit 52. The output of the adder 54 becomes the restored data which is aimed at. The delay circuit 56 is a data latch circuit similar to the delay circuit 48, delaying the output of the adder 54 by one picture element before it is supplied to the coefficient multiplier 58. The coefficient multiplier 58 multiplies the input by a constant coefficient, for example, 0.95. Its output is supplied to the adder 54. By such a loop process, the compressed data (3 bits) of the input is expanded to the original data of 8 bits.

The discrete cosine transformation method as its details are described in pp. 179–195 of "Digital Signal Processing of Image" by Keihiko Suibatsu published by Nikkan Kogyo Shinbun Co. Ltd., is briefly explained as follows. At first, by the discrete cosine transformation, the image data is orthogonally transformed and the frequency components are taken out. These frequency components are multiplied by such a coefficient that the low-frequency component is left, while the high-frequency component is removed. By this, the image information can be compressed. When the frequency components of the image are sided to the lower one, good compression with less deterioration can be carried out.

Next, the selection criterion by the compression selecting circuit 20 is explained. For simplicity, the compression circuits 22 and 24 themselves, or similar circuits, perform compression processing by each of the plurality of compressing methods, and whichever gives a less amount of data may be selected. If it is desired to speed up the selecting operation, a portion of the image, for example, the central one, only is subjected to the plurality of compression treatments. Based on the comparison of the data amounts, selection of one of the compression treatments may be made. Also, one of the compression circuits, say 22, employs a compression method which gives always a constant amount of compressed data, while the other compression circuit 24 employs another compression method which varies the amount of compressed data as a function of the image. So, from only the amount of data output from the compression circuit 24, which compression circuit 22 or 24 is to be selected may be determined.

The compression circuits 22 and 24 may employ different compressing methods from each other. But the compressing methods may be the same, or quantitatively different in the compression characteristic. In the case of DPCM, for example, the quantizing characteristic of the non-linear quantization circuit 42 is changed.

Though, in the above-described embodiment, the two compressing processes are selectively used, the invention is not confined to this and so includes a mode of non-compression and another mode of compression. Also, the image data is not only for black and white but also likewise for colors. Further, the selection of the compressing methods may otherwise be made not automatically but manually.

As is easily understandable from the foregoing description, according to the invention, the amount of data of an image to be recorded can be compressed by the method suitable to the respective individual image, thereby giving an advantage of more efficiently utilizing the image recording medium.

The invention is next described in connection with another embodiment thereof.

FIG. 4 in block diagram shows another embodiment of the still video camera according to the invention, and FIG. 5 is a flowchart for the operation of this embodiment In FIG. 4, the camera comprises a lens 61, a CCD 62 (solid-state image sensor) for converting an image formed thereon by the lens 61 to an electrical signal; a signal processing portion 63 for processing the signal output from the CCD 62, an A/D converter 64 for converting the signal output from the signal processing portion 63 to digital form, a data compressing portion 65 for compressing the digitized image signal, a connector 66; a memory cartridge 67 (memory element) detachably attached to the camera body, and a block 68 for controlling the entirety including a timing control circuit and a system control portion (hereinafter called the "system controller").

In the interior of the data compressing portion 65, a program ROM for determining the compressing method is incorporated. As this ROM, use is made of a rewritable EEPROM (Electrically Erasable Programmable Read-Only Memory). The memory cartridge 67 is available in types for photography and for a compression program. When the latter type is in use, the content of the EEPROM in the data compressing portion 65 is rewritten by the system controller 68 into the content of the compression program cartridge.

FIG. 5 shows a flowchart for the operation of this embodiment.

After initialization (step S101) has been done, when a memory cartridge is inserted (step S102), whether it is for photography or for compression programs is discriminated (step S103). If for compression programs; a compression code number representing the compression program is written (step S104) and the compression program is transferred to the EEPROM (step S105). When this has ended, the "end" display is presented (step S106). If it is for photography, an initiation of a shutter operation (step S110) is followed by writing the compression code number (step S111) and the photographed image data (step S112).

In such a manner, the program for use in the compression of the video signal can be written and rewritten in the form of electrical signals by the cartridges from the outside of the camera.

It should be noted that the camera may be provided with an input terminal for program, from which a program for compression is supplied in the form of an electrical signal by an adequate device, thus rewriting the program of the EEPROM of the data compressing portion 65.

As has been described above, according to the present embodiment, the program for compression of the data in the camera is alterable by the electrical signal supplied from the outside of the camera. Therefore, a wide variety of compressing methods become selectively usable. Hence, the camera is made convertible to the newest data compression type. Further, when the object to be photographed is a flower, the camera can be made to operate with selection of one of the compressing methods which is most suited to the flower.

What is claimed is:

1. An image signal compressing apparatus, comprising:
   (a) input means for inputting an image data;
   (b) compression means for compressing the input image data according to any one of a plurality of compression programs, said compression means being able to perform various compressing methods;
   (c) memory means for storing the compression programs, said programs being related respectively to said various compressing methods and being transcribable; and
   (d) means for outputting compressed data and data indicating the compression program in a multiplexed manner.

2. An image sensing apparatus comprising:
   (a) image sensing means for photoelectrically converting an image light coming from an object to be photographed;
   (b) compression means for compressing an output of the image sensing means according to any of a plurality of compression, programs said compression means being able to perform various compressing methods;
   (c) transcribable memory means for storing the compression programs, said programs being related respectively to said various compressing methods and being transcribable; and
   (d) means for combining compressed data by the compression means with data representing the compression program.

3. An apparatus according to claim 2, wherein said memory means includes a memory card.

4. An apparatus according to claim 2, wherein said image sensing means includes a CCD.

5. An image signal compressing apparatus, comprising:
   (a) image sensing means for photoelectrically converting an image light coming from an object to be photographed;
   (b) compression means for compressing an output of the image sensing means according to any one of a plurality of compression programs, said compression means being able to perform various compressing methods;
   (c) transcribable memory means for storing the compression programs, said programs being related respectively to said various compressing methods and being transcribable;
   (d) means for combining compressed data by the compression means with data representing the compression program; and
   (e) recording means for recording the compressed data with the data representing the compression program.

6. An apparatus according to claim 5, wherein said memory means includes a memory card.

7. An apparatus according to claim 5, wherein said image sensing means includes a CCD.

8. An image signal compressing apparatus, comprising:
   (a) input means for inputting an image data;
   (b) compression means for compressing the input image data according to any one of a plurality of compression programs, said compression means being able to perform various compressing methods;
   (c) transcribable memory means for storing the compression programs, said programs being related respectively to said various compressing methods and being transcribable;

(d) means for combining compressed data by the compression means with data representing the compression program; and (e) recording means for recording the compressed data with the data representing the compression program.

9. An image signal compressing apparatus according to claim 8, wherein said memory means includes a memory card.

10. An image signal compressing apparatus according to claim 8, wherein said image data inputting means includes image sensing means.

11. An image signal compressing apparatus according to claim 10, wherein said image sensing means includes a CCD.

\* \* \* \* \*

UNITED STATES PATENT AND TRADEMARK OFFICE
CERTIFICATE OF CORRECTION

PATENT NO. : 5,764,286
DATED : June 9, 1998
INVENTOR(S) : Hideaki Kawamura, et al.

It is certified that error appears in the above-identified patent and that said Letters Patent is hereby corrected as shown below:

Col. 1, line 17, delete "known ID" and insert -- known. In --.

Col. 1, line 25, after "elements" insert -- . --.

Col. 1, line 31, delete "an image storage capacity" and insert -- as high a capacity of image --.

Col. 1, line 34, after "megabits" insert -- . --.

Col. 5, line 9, delete "In FIG. 4," and insert -- . --.

Col. 5, line 10, start a new paragraph and insert -- In FIG. 4, --.

Signed and Sealed this

Thirtieth Day of March, 1999

Attest:

Q. TODD DICKINSON

*Attesting Officer*      *Acting Commissioner of Patents and Trademarks*